(12) United States Patent
Uchida et al.

(10) Patent No.: US 7,542,406 B2
(45) Date of Patent: Jun. 2, 2009

(54) OPTICAL INFORMATION RECORDING MEDIUM

(75) Inventors: Mamoru Uchida, Gunma (JP); Isao Okitsu, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 536 days.

(21) Appl. No.: 11/020,912

(22) Filed: Dec. 23, 2004

(65) Prior Publication Data

US 2005/0169160 A1   Aug. 4, 2005

(30) Foreign Application Priority Data

Dec. 26, 2003   (JP)   ............................. 2003-433005

(51) Int. Cl.
G11B 7/24 (2006.01)

(52) U.S. Cl. ................. 369/275.4; 369/275.1

(58) Field of Classification Search ................. 369/277, 369/278, 279, 275.1–275.5
See application file for complete search history.

(56) References Cited

U.S. PATENT DOCUMENTS

| | | | |
|---|---|---|---|
| 4,687,728 A | | 8/1987 | Folkard et al. |
| 5,274,623 A | * | 12/1993 | Usami et al. ............. 369/275.1 |
| 5,369,321 A | | 11/1994 | Koike et al. |
| 5,696,758 A | * | 12/1997 | Yanagimachi et al. .... 369/275.4 |
| 6,028,836 A | * | 2/2000 | Kosuda et al. ........... 369/275.1 |
| 6,639,892 B2 | * | 10/2003 | Usami ..................... 369/275.4 |
| 6,673,411 B2 | * | 1/2004 | Koide et al. ................ 428/64.1 |
| 6,984,434 B2 | * | 1/2006 | Usami et al. ............... 428/64.4 |

| | | | |
|---|---|---|---|
| 2002/0051941 A1 | | 5/2002 | Shoda et al. |
| 2002/0106475 A1 | * | 8/2002 | Mihara et al. ............... 428/64.4 |
| 2002/0150030 A1 | * | 10/2002 | Takagishi et al. ........ 369/275.1 |
| 2002/0150034 A1 | * | 10/2002 | Takagishi et al. ........... 369/277 |
| 2002/0154595 A1 | * | 10/2002 | Takagishi et al. ........... 369/277 |
| 2006/0114804 A1 | * | 6/2006 | Uchida et al. ............ 369/275.1 |
| 2007/0054219 A1 | | 3/2007 | Satake et al. |

FOREIGN PATENT DOCUMENTS

| | | |
|---|---|---|
| EP | 0467716 A2 | 1/1992 |
| EP | 0 881 636 | 12/1998 |
| EP | 1039456 A1 | 9/2000 |
| EP | 1215671 A2 | 6/2002 |
| EP | 1256947 A1 | 11/2002 |
| EP | 1333434 A1 | 8/2003 |
| JP | 06-282871 | 10/1994 |
| JP | 11-213442 | 8/1999 |
| JP | 2000-268409 | 9/2000 |

(Continued)

Primary Examiner—Tan X Dinh
(74) Attorney, Agent, or Firm—Knobbe Martens Olson & Bear LLP

(57) ABSTRACT

An optical information recording medium includes a substrate having a pregroove thereon, an optical recording layer containing a light-absorbing substance composed of a dye absorbing a laser beam, and a light-reflective layer reflecting the laser beam. The ratio of the cross-sectional area of the optical recording layer (i.e., the dye) in the pregroove to the cross-sectional area of the pregroove in the direction of the diameter of the optical information recording medium is about 30% to about 63%. In the optical information recording medium, the phenomenon by which the recording power of the laser beam heats the dye in the optical recording layer and the heat is diffused through the optical recording layer and the light-reflective layer is considered.

13 Claims, 7 Drawing Sheets

FOREIGN PATENT DOCUMENTS

| | | |
|---|---|---|
| JP | 2000-309722 | 11/2000 |
| JP | 2002-222542 | 8/2002 |
| JP | 2003-140300 | 5/2003 |
| JP | 2004-272983 | 9/2004 |
| WO | WO 01/59778 A1 | 8/2001 |
| WO | WO 01/59779 A1 | 8/2001 |

* cited by examiner

OPTICAL RECORDING LAYER RATIO IN PREGROOVE $$= \frac{(W_{st}+W_{sb}) \times H_{sg} \div 2 - (W_{st}-2W_x+W_{db}) \times (H_{sg}-H_{sd}) \div 2}{(W_{st}+W_{sb}) \times H_{sg} \div 2} \times 100$$

LIGHT-REFLECTIVE LAYER RATIO IN PREGROOVE $$= \frac{(W_{st} - 2W_x + W_{db}) \times (H_{sg}-H_{sd}) \div 2}{(W_{st}+W_{sb}) \times H_{sg} \div 2} \times 100$$

FIG. 12

EVALUATION RESULT OF MEDIA IN
EXAMPLES AND COMPARATIVE EXAMPLES

| | (1) | (2) | (3) | (4) | (5) | DC-Jitter |
|---|---|---|---|---|---|---|
| EXAMPLE 1 | 48.9% | 108.9 nm | 71.4 nm | 40.2 deg | 0.221 | 6.5% |
| EXAMPLE 2 | 57.8% | 100.4 nm | 79.9 nm | 38.6 deg | 0.239 | 7.4% |
| EXAMPLE 3 | 53.0% | 98.0 nm | 82.2 nm | 39.2 deg | 0.292 | 7.9% |
| COMPARATIVE EXAMPLE 1 | 64.5% | 85.8 nm | 94.4 nm | 37.3 deg | 0.291 | 14.1% |
| COMPARATIVE EXAMPLE 2 | 71.1% | 72.5 nm | 90.9 nm | 37.4 deg | 0.293 | 21.4% |

# OPTICAL INFORMATION RECORDING MEDIUM

BACKGROUND OF THE INVENTION

1. Field of the Invention

The present invention relates to an optical information recording medium, in particular, to an optical information recording medium including a transparent substrate, an optical recording layer absorbing a laser beam formed on the substrate, the optical recording layer containing at least, for example, a light-absorbing substance composed of a dye, and a light-reflective layer composed of materials such as a metal film, wherein writing and reading can be performed with high density and speed using a red laser beam having a wavelength of, for example, 640 to 680 nm.

2. Description of the Related Art

Recently, write-once optical information recording media such as DVD-R and DVD+R have been developed. These media use an organic dye compound corresponding to a semiconductor laser having a wavelength of 640 to 680 nm (for example, 650 to 665 nm) as an optical recording layer. A known CD-R has a track pitch of 1.6 µm and a storage capacity of 600 to 650 MB. In contrast, optical information recording media such as DVD-R and DVD+R have a track pitch of 0.74 µm which is smaller than that of the CD-R, and a storage capacity of 4.7 GB which enables a very high recording density. Furthermore, regarding the recording speed, the CD-R has a reference scanning velocity of 1.2 to 1.4 m/s, whereas the DVD-R/+R has a much higher reference scanning velocity of 3.49 m/s. For recording onto DVD-R/+R, recording instruments having a recording speed of eight times the reference scanning velocity (8× speed) are in practical use. However, at present, a recording instrument having a recording speed sixteen times the reference scanning velocity (16× speed) is not in practical use. In the optical information recording medium using an organic dye compound as the optical recording layer, recording and playback characteristics are required over a wide range of recording speeds, from low speed to high speed. Under the present situation, however, such an optical information recording medium that has recording and playback characteristics adequate to cover a wide range of recording speeds is not realized.

In high speed recording, a high recording power increases the amount of heat generated during recording or per unit time. This causes a problem of thermal strain to become obvious, resulting in variations in the recording pits. Furthermore, the output power of a semiconductor laser is limited. Therefore, a dye material with high sensitivity that can be compatible with high speed recording is desired.

Accordingly, regarding the characteristics of the organic dye material forming the optical recording layer, the complex refractive index (hereinafter referred to as "refractive index") must be further increased to reduce the thickness of the optical recording layer, thus controlling the heat generated during recording. In addition, the dye in the optical recording layer must be decomposed with a recording power as low as possible. The trend for decreasing the thickness of the optical recording layer is, when the recording speed is represented based on a reference scanning velocity (corresponding to 1× speed) of 3.49 m/s (about 3.5 m/s), the average of 60 nm at 2× speed, 54 nm at 4× speed, 44 to 47 nm at 8× speed, and about 40 nm at 16× speed etc. However, even if the molecules of the organic dye material are designed to have a high refractive index, possible chemical structures are limited. Therefore, under the present situation, such a dye that can be compatible with high speed recording cannot sufficiently be designed. On the other hand, the recording power at low speed recording is too low. Therefore, when the thickness of the optical recording layer is decreased in order to provide characteristics for high speed recording, it is difficult to form sufficiently large pits.

As described above and will also be described later, in high speed recording, at the recording speed of 8× or more in particular, the amount of heat generated during recording is increased because of the high recording power. Accordingly, configuration factors and thermophysical properties must be designed so as to be suitable for thermal control during recording. The configuration factors include the shape of the optical recording layer in a pregroove on a substrate, the shape of the light reflective layer in the pregroove, and the shape of the substrate. The thermophysical properties include the decomposition temperature of the dye and the calorific value. In order to decrease the recording power, optical design of the dye, for example, increasing light absorption of the organic dye material is also required. In a media design suitable for high speed recording, the thickness of the optical recording layer is reduced. As a result, the physical size of the pits formed is decreased in low speed recording. In order to perform appropriate recording from low speed to high speed, the pits must be made optically larger using an organic dye material having high refractive index. Furthermore, a measure for heat dissipation in high speed recording is also required.

As described above, in order to perform the appropriate recording from low speed to high speed, in particular, recording at high speed recording, the configuration factors and thermophysical properties of the dye are preferable to be designed so as to be suitable for thermal control and the heat dissipation measure (see, domestic re-publication of PCT international publication for patent application No. 2001-59778).

SUMMARY OF THE INVENTION

One aspect of the invention provides an optical information recording medium that can record with high density and high speed using a laser beam, in particular, having a wavelength of about 640 nm to about 680 nm.

Another aspect of the invention provides an optical information recording medium wherein heat dissipation characteristics are improved in view of the regulation of heat generated by a recording power during recording on an optical recording layer.

Another aspect of the invention provides an optical information recording medium wherein configuration factors such as the shape of the optical recording layer, the shape of a light-reflective layer, and thermophysical properties of a dye are considered.

According to embodiments of the present invention, it is difficult to achieve a significant advantage by controlling the thermophysical properties of a dye, which is particularly related to the control of heat generation during recording. On the other hand, a significant advantage that improves the effect of the generated heat can be achieved by controlling the configuration factors, which is related to the control of heat dissipation. Embodiments of the present invention have been accomplished by paying attention to the following point, i.e., a phenomena in which the recording power of a laser beam heats a light-absorbing substance such as a dye in a pregroove while the heat is diffused through the optical recording layer and the light-reflective layer, thus improving the heat dissipation effect of the diffusing heat. According to one embodiment of the present invention, an optical information recording medium includes a transparent substrate having a pregroove thereon, an optical recording layer absorbing a laser beam and formed on the substrate, and a light-reflective layer reflecting the laser beam and formed on the optical recording layer. In the optical information recording medium, optically readable information is recorded by irradiating the laser beam on the optical recording layer through the substrate. According to a first aspect of the present invention, in the pregroove, the ratio of the cross-sectional area of the optical recording layer to the cross-sectional area of the pregroove in the direction of the diameter of the optical information recording medium is about 30% to about 63%.

According to another embodiment of the present invention, an optical information recording medium includes a transparent substrate having a pregroove thereon, an optical recording layer absorbing a laser beam and formed on the substrate, and a light-reflective layer reflecting the laser beam and formed on the optical recording layer. In the optical information recording medium, optically readable information is recorded by irradiating the laser beam on the optical recording layer through the substrate. According to a second aspect of the present invention, in the pregroove, the ratio of the cross-sectional area of the light-reflective layer to the cross-sectional area of the pregroove in the direction of the diameter of the optical information recording medium is about 37% to about 70%.

According to another embodiment of the present invention, an optical information recording medium includes a transparent substrate having a pregroove thereon, an optical recording layer absorbing a laser beam and formed on the substrate, and, a light-reflective layer reflecting the laser beam and formed on the optical recording layer. In the optical information recording medium, optically readable information is recorded by irradiating the laser beam on the optical recording layer through the substrate. According to a third aspect of the present invention, the light-reflective layer projects into the pregroove.

According to another embodiment of the present invention, an optical information recording medium includes a transparent substrate having a pregroove thereon; an optical recording layer absorbing a laser beam and formed on the substrate; and a light-reflective layer reflecting the laser beam and formed on the optical recording layer. In the optical information recording medium, optically readable information is recorded by irradiating the laser beam on the optical recording layer through the substrate. According to a forth aspect of the present invention, a thickness of the light-reflective layer in the pregroove is greater than a thickness of the recording layer in the pregroove.

The optical recording layer ratio in the pregroove is preferably about 30% to about 57%.

The light-reflective layer ratio in the pregroove is preferably about 43% to about 70%.

The projecting depth of the light-reflective layer in the pregroove is preferably about 83 nm to about 140 nm.

The projecting depth of the light-reflective layer in the pregroove is preferably about 93 nm to about 140 nm.

The optical recording layer preferably has a thickness of about 35 nm to about 90 nm in the pregroove.

The optical recording layer preferably has a thickness of about 35 nm to about 83 nm in the pregroove.

An inclination angle of the optical recording layer in the pregroove is preferably about 37.5 degrees to about 60 degrees.

The inclination angle of the optical recording layer in the pregroove is preferably about 38.5 degrees to about 60 degrees.

The optical recording layer preferably has a leveling value of about 0.15 to about 0.29.

The optical recording layer preferably has a leveling value of about 0.15 to about 0.26.

A reference scanning velocity during recording is preferably about 3.49 m/s. The optical information recording medium can be preferably compatible with a recording speed of S×n (wherein S represents the reference scanning velocity during recording, and n represents an integer of 8 or higher).

The optical information recording medium can be preferably compatible with a recording speed of S×n (wherein S represents the reference scanning velocity during recording, and n represents an integer of exceeding 8). The recording wavelength of the laser beam is preferably about 640 nm to about 680 nm.

In addition, above-mentioned each condition defined by each range includes a margin of error on each measurement.

An advantage according to an embodiment of the present invention is as follows: In an optical information recording medium, since the optical recording layer ratio in the pregroove is about 30% to about 63%, the calorific value during the formation of recording pits can be properly controlled. As a result, preferable recording characteristics can be maintained in a recording area compatible with higher speed recording. In one embodiment of the present invention, in addition to paying attention to the optical recording layer ratio in the pregroove, a projecting depth of the optical recording layer projecting toward the inside of the pregroove and a light-reflective layer ratio in the pregroove are also considered. As a result, the heat generated in the optical recording layer during recording can be immediately transmitted and diffused toward the light-reflective layer having a high thermal conductivity. Therefore, the heat dissipation can be controlled effectively and efficiently. In a very high speed recording such as 8× speed or even 16× speed, the optical information recording medium according to one embodiment of the present invention can improve the heat dissipation effect of the heat generated during recording to form appropriate recording pits.

BRIEF DESCRIPTION OF THE DRAWINGS

FIG. 12 is a table showing optical recording layer ratios in a pregroove, projecting depths of a light-reflective layer in the pregroove, thicknesses of the optical recording layer in the pregroove, inclination angles of the optical recording layer in the pregroove, leveling values of the optical recording layer, and DC-Jitter values in Examples 1 to 3 and Comparative Examples 1 and 2 according to an embodiment of the present invention.

DESCRIPTION OF THE PREFERRED EMBODIMENTS

According to an embodiment of the present invention, since the optical recording layer ratio in the pregroove is about 30% to about 63%, a media compatible with higher speed recording and high density recording can be realized.

Figure 1:
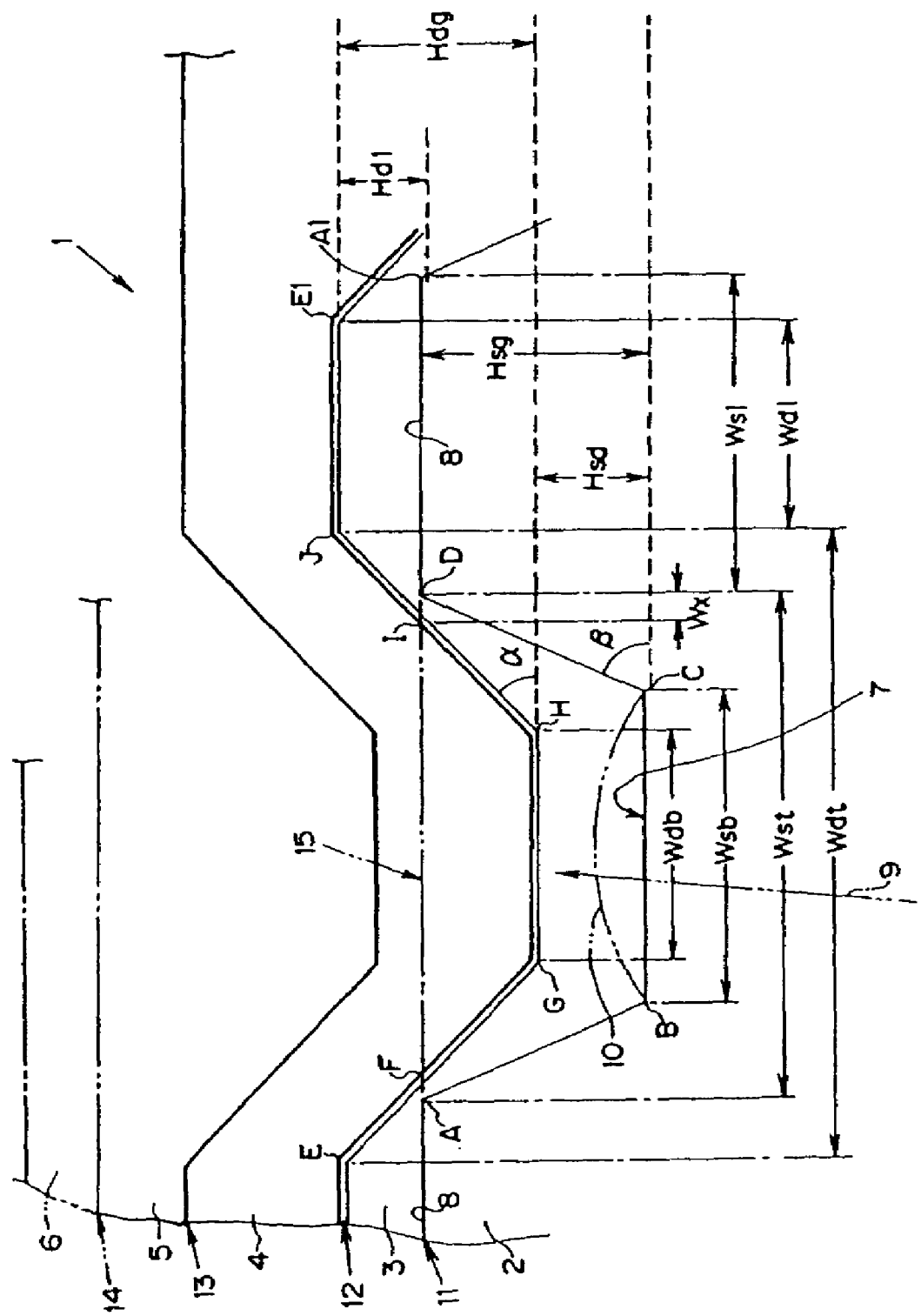
FIG. 1 is an enlarged cross-sectional view of the relevant part of an optical information recording medium according to an embodiment of the present invention.

An optical information recording medium according to an embodiment of the present invention will be described with reference to FIGS. 1 to 9. FIG. 1 is an enlarged cross-sectional view of the relevant part of a disc-shaped optical information recording medium 1. That is, FIG. 1 is a cross-sectional view along with the diameter showing a cut surface of the optical information recording medium 1. In more detail, FIG. 1 schematically shows a cross-sectional view perpendicular to the surface with a pregroove 7 and orthogonal to the direction of the pregroove 7. The optical information recording medium 1 includes a transparent substrate 2, an optical recording layer 3 (light-absorbing layer) formed on the substrate 2, a light-reflective layer 4 formed on the optical recording layer 3, and a protective layer 5 formed on the light-reflective layer 4. A dummy substrate 6 having a predetermined thickness is further disposed on the protective layer 5 through the adhesive layer to provide a thickness required by the DVD standard. By the way, the adhesive layer may be doubled as the protective layer.

The pregroove 7 forming a spiral shape is disposed on the substrate 2. A land 8, which is a part other than the pregroove 7, is disposed on both sides of the pregroove 7.

As shown in FIG. 1, when the optical information recording medium 1 is irradiated with a laser beam 9 (recording beam), the optical recording layer 3 absorbs the energy of the laser beam 9 to generate heat. As a result, a thermal alteration occurs on the side adjacent to the substrate 2 to form a recording pit 10.

The substrate 2 and the optical recording layer 3 are in contact with each other at a first boundary 11.

The optical recording layer 3 and the light-reflective layer 4 are in contact with each other at a second boundary 12. The light-reflective layer 4 and the protective layer 5 are in contact with each other at a third boundary 13. The protective layer 5 and the dummy substrate 6 are in contact with each other at a fourth boundary 14.

The transparent substrate 2 is composed of a material having a high transparency and a refractive index of, for example, about 1.5 to about 1.7 with a laser beam. The substrate 2 is chiefly composed of a resin plate having high impact resistance such as polycarbonate, acrylic resin, and epoxy resin, or a glass plate.

The optical recording layer 3 formed on the substrate 2 is composed of a light-absorbing substance containing, for example, a dye. Irradiation of the laser beam 9 causes heat generation, melting, sublimation, deformation, or alteration of the optical recording layer 3. For example, the optical recording layer 3 is evenly formed by spin coating a solution containing a solvent and a dye such as an azo dye or a cyanine dye on the surface of the substrate 2. Although any material for optical recording can be used for the optical recording layer 3, light-absorbing organic dyes are preferably used.

The light-reflective layer 4 is a metal film having a high thermal conductivity and a high light reflectivity. For example, the light-reflective layer 4 is formed by vacuuming deposition or sputtering using gold, silver, copper, aluminum, or an alloy thereof.

The protective layer 5 is composed of a resin having a high impact resistance, as in the substrate 2, and superior adhesiveness. For example, the protective layer 5 is formed by applying an ultraviolet-curing resin by spin coating. The resultant substrate is then irradiated with ultraviolet rays to cure the resin.

The dummy substrate 6 is composed of the same material as the substrate 2 to provide the predetermined thickness of about 1.2 mm.

In FIG. 1, dimensions of each part of the optical information recording medium 1 are defined as shown in the figure. Referring to the pregroove 7 in FIG. 1, in the first boundary 11 between the substrate 2 and the optical recording layer 3, the upper left corner is defined as point A, the lower left corner is defined as point B, the lower right corner is defined as point C, and the upper right corner is defined as point D. The upper left corner of the light-reflective layer 4 disposed on the land 8 is defined as point E. The intersection of an opening level line 15 (virtual line) and the left slanted part of the light-reflective layer 4 is defined as point F. The opening level line 15 extends from the land 8 to the opening of the pregroove 7 at the same level as the first boundary 11. The lower left corner of the light-reflective layer 4, which projects toward the pregroove 7 in the direction of the substrate 2, is defined as point G. The lower right corner of the light-reflective layer 4 is defined as point H. The intersection of the opening level line 15 and the right slanted part of the light-reflective layer 4 is defined as point I. The upper right corner of the light-reflective layer 4 disposed on the land 8 is defined as point J. The maximum width (width along the diameter of the optical information recording medium 1) of a recess of the light-reflective layer 4 above the pregroove 7 is defined as Wdt (the length of line EJ). The minimum width of the recess of the light-reflective layer 4 in the pregroove 7 is defined as Wdb (the length of line GH). The maximum width of the optical recording layer 3 in the pregroove 7 is defined as Wst (the length of line AD). The minimum width of the optical recording layer 3 in the pregroove 7 is defined as Wsb (the length of line BC). The width of the protrusion of the light-reflective layer 4 above the land 8 is defined as Wdl (the length of line JE1). The width on the land 8 of the optical recording layer 3 is defined as Wsl (the length of line DA1). The width of the optical recording layer 3 between the optical recording layer 3 and the light-reflective layer 4 at the same level as the first boundary 11 of the land 8 is defined as Wx (the length of lines AF and ID). The depth (dye groove depth) from the second boundary 12 of the light-reflective layer 4 above the land 8 to the second boundary 12 in the pregroove 7 is defined as Hdg (the length between line JE and line GH). The depth of the optical recording layer 3 on the land 8 is defined as Hdl (the length between line JE and line DA). The depth of the pregroove 7 (substrate groove depth) is defined as Hsg (the length between line DA and line BC). The depth between the optical recording layer 3 and the light-reflective layer 4 in the pregroove 7 is defined as Hsd (the length between line GH and line BC). The angle of the slanted part of the light-reflective layer 4 in the optical recording layer 3 (dye groove angle) is defined as angle α. The angle of the slanted part of the optical recording layer 3 in the substrate 2 (substrate groove angle) is defined as angle β.

The cross-sectional shape and each dimension of the optical information recording medium 1 were measured as follows: A part of the second boundary 12 between the optical recording layer 3 and the light-reflective layer 4 was broken apart by inserting a metal spatula from a center hole of the optical information recording medium 1 to decompose the optical information recording medium 1. Subsequently, the organic dye material (optical recording layer 3) adhered to a side of the light-reflective layer 4 was washed off with ethanol. This sample was used for measuring the shape of the dye layer, except parts damaged during decomposing with the spatula. The organic dye material (optical recording layer 3) adhered to a side of the substrate 2 was washed off with ethanol. This sample was used for measuring the shape of the substrate 2, except parts damaged during decomposing with the spatula. The shapes of each part were measured with an atomic force microscope (AFM) (from ThermoMicroscopes, Autoprobe M5).

Figure 2:
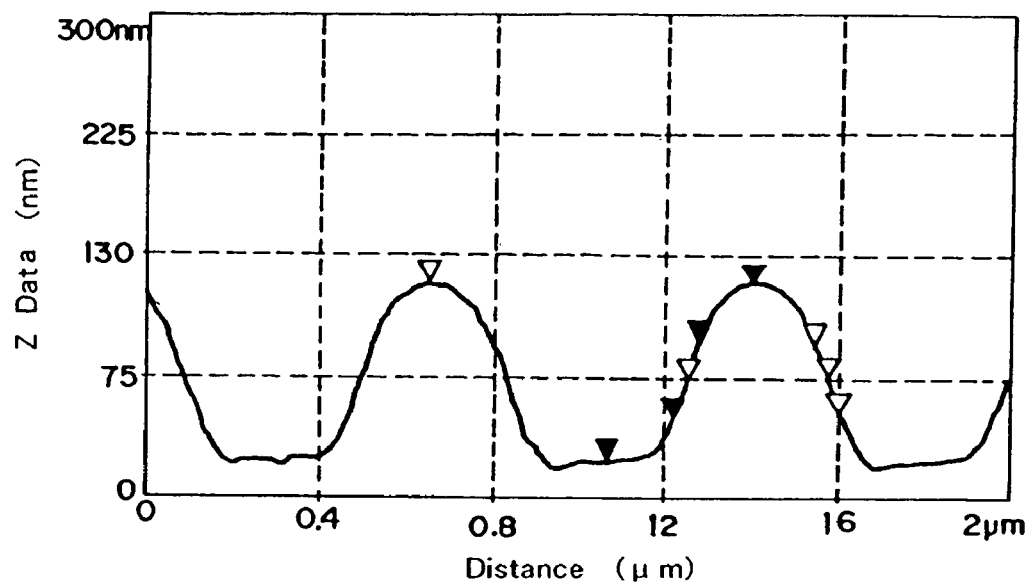
FIG. 2 is a graph showing a measurement result of the shape of the side of a light-reflective layer according to an embodiment of the present invention.
Figure 3:
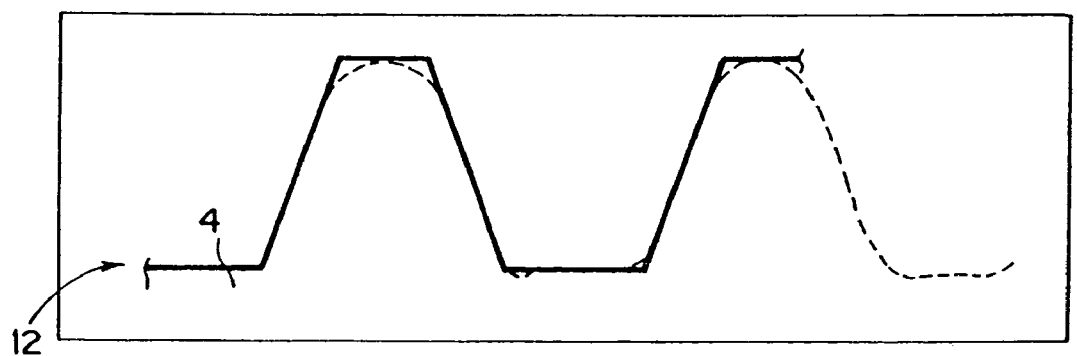
FIG. 3 is a graph showing the cross-sectional shape of the light-reflective layer obtained by approximating the curve in FIG. 2 with straight lines, according to an embodiment of the present invention.

FIG. 2 is a graph showing a result of measuring the cross-sectional shape of the light-reflective layer 4. Although the actual measured shape is shown by a curved line, the curved line is approximated with straight lines so that a calculation is easily performed using data such as the depth, the full width at half-maximum, and the angle. FIG. 3 is a graph showing the cross-sectional shape of the light-reflective layer 4 obtained by approximating the curved line in FIG. 2 with straight lines. The dotted line shows the actual measured shape and the continuous line shows the approximate shape. The shape of the substrate 2 was also measured in the same way as described above.

The design of thermal control during high speed recording in the present invention will now be described. In recording onto the optical information recording medium 1, the laser power of the laser beam 9 rapidly heats the organic dye material in the pregroove 7. The heat is diffused through the optical recording layer 3 and the light-reflective layer 4. This diffusing heat is transferred to the adjacent tracks or to the pregroove 7. These areas are heated to some degree, forming a preheated state. When the substrate in this preheated state is irradiated with the laser beam 9 for the subsequent recording, an enlarged recording pit is formed due to the effect of the preheating. As a result, the shape of the formed recording pit 10 becomes different from a recording mark that supposed to be recorded.

The stronger the laser power of the laser beam 9, that is, the higher the recording speed, the greater the amount of heat generated. For example, according to a standard DVD-R media, it is expected that the recording power (laser intensity) is about 6 to about 10 mW at 1× speed recording (about 3.5 m/s), about 15 to about 20 mW at 4× speed recording, about 25 to about 30 mW at 8× speed recording, and about 40 mW or more at 16× speed recording. In short, it becomes more important for a media compatible with high speed recording that the heat generated during recording does not affect the adjacent part.

The factors to control the heat generated during recording in the optical information recording medium 1 are roughly divided into control of heat generation and control of heat dissipation. The control of heat generation relates to physical properties of materials such as the calorific value and the decomposition temperature of the material itself of the optical recording layer 3. The control of heat dissipation closely relates to configuration factors such as the shapes of the optical recording layer 3 and the substrate 2, that is, the thickness of the optical recording layer 3, and the shape of the second boundary 12 between the optical recording layer 3 and the light-reflective layer 4. For example, the optical recording layer 3, which is a thin film composed of an organic dye material, is disposed between the light-reflective layer 4 which is a metal thin film, and the substrate 2 composed of polycarbonate. It is obvious that the metal (light-reflective layer 4) has a thermal conductivity higher than that of the polycarbonate, a plastic material (substrate 2). Therefore, the control of heat dissipation closely relates to the configuration factors.

As a result of intensive study to improve the thermal effect, the present inventors have found that it is difficult to achieve a significant advantage by controlling the heat generation, whereas a significant advantage can be achieved by controlling the heat dissipation based on the configuration factors such as the shapes of the optical recording layer 3 and the substrate 2.

As described above, the control of heat dissipation, more specifically, the shapes of the optical recording layer 3 and the light-reflective layer 4 in the pregroove 7, are the most dominant in thermal control during high speed recording. The present invention has been accomplished by paying attention to this point. In particular, the shape of the optical recording layer 3 represented by the following items significantly affects thermal control (control of heat dissipation) during high speed recording. Furthermore, the following Items (1) and (2) particularly affect thermal control.

Figures 4, 5:
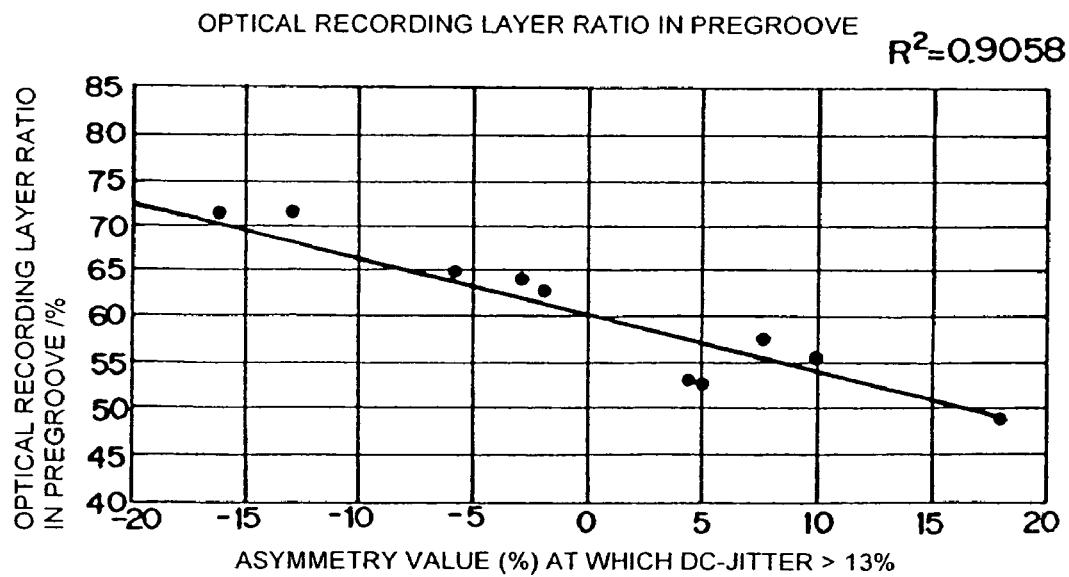
FIG. 4 shows formulae for calculating an optical recording layer ratio in the pregroove and a light-reflective layer ratio in the pregroove, according to an embodiment of the present invention.
FIG. 5 is a graph showing the relationship between an asymmetry value at which DC-Jitter>13% and the optical recording layer ratio in the pregroove, according to an embodiment of the present invention.

(1) The optical recording layer ratio in the pregroove 7. This optical recording layer ratio in the pregroove is equivalent to the ratio of the area obtained by subtracting the area of trapezoid FGHI from that of trapezoid ABCD to the area of trapezoid ABCD in FIG. 1. FIG. 4 shows the formula for calculating this optical recording layer ratio in a pregroove.

(2) The projecting depth (Hsg−Hsd) of the light-reflective layer 4 in the pregroove 7.

(3) The thickness (Hsd) of the optical recording layer 3 in the pregroove 7.

(4) The inclination angle (α) of the optical recording layer 3 in the pregroove 7.

(5) The leveling value ((Hsg−Hdg)/Hsg) of the optical recording layer 3.

(6) The light-reflective layer ratio in the pregroove 7. In one embodiment of the present invention, attention can also be paid to the ratio of the light-reflective layer 4 in the pregroove 7, which is related to the optical recording layer ratio in the pregroove. As the formula shown in FIG. 4, the light-reflective layer ratio in the pregroove can be defined as in the optical recording layer ratio in the pregroove.

According to one embodiment of the present invention, in order to be compatible with high speed recording of 8× speed or more, the above Items are preferably in the following range.

(1) The optical recording layer ratio in the pregroove is controlled to be about 30% to about 63%. When the optical recording layer ratio in the pregroove is less than about 30%, the recording pit 10 having sufficient dimensions cannot be formed. When the optical recording layer ratio in the pregroove exceeds about 63%, as will be described later with reference to FIG. 5, DC-Jitter cannot be controlled within a standard value.

(2) The projecting depth (Hsg−Hsd) of the light-reflective layer in the pregroove is controlled to be about 83 nm to about 140 nm. When the projecting depth is less than about 83 nm, as will be described later with reference to FIG. 6, the DC-Jitter cannot be controlled within the standard value. When the projecting depth exceeds about 140 nm, the recording pit 10 having sufficient dimensions cannot be formed because of an insufficient amount of dye in the pregroove 7.

(3) The thickness (Hsd) of the optical recording layer in the pregroove is controlled to be about 35 nm to about 90 nm. When the thickness is less than about 35 nm, the recording pit 10 with sufficient dimensions cannot be formed because of an insufficient amount of dye in the pregroove 7. When the thickness exceeds about 90 nm, as will be described later with reference to FIG. 7, the DC-Jitter cannot be controlled within the standard value.

(4) The inclination angle (α) of the optical recording layer in the pregroove is controlled to be about 37.5 degrees to about 60 degrees. When the angle is less than about 37.5 degrees, as will be described later with reference to FIG. 8, the DC-Jitter cannot be controlled within the standard value. When the angle exceeds about 60 degrees, the shape of the light-reflective layer 4 is significantly distorted. As a result, a sufficient reflectance cannot be provided.

(5) The leveling value ((Hsg−Hdg)/Hsg) of the optical recording layer is controlled to be about 0.15 to about 0.29. When the leveling value is less than about 0.15, the shape of the light-reflective layer 4 is significantly distorted. As a result, a sufficient reflectance cannot be provided. When the leveling value exceeds about 0.29, as will be described later with reference to FIG. 9, the DC-Jitter cannot be controlled within the standard value.

(6) The light-reflective layer ratio in the pregroove is controlled to be about 37% to about 70%.

In order to be compatible with high speed recording exceeding 8× speed (for example, 16× speed), the above Items are preferably in the following range.

(1) The optical recording layer ratio in the pregroove is controlled to be about 30% to about 57%. When the optical recording layer ratio in the pregroove is less than about 30%, the recording pit 10 having sufficient dimensions is difficult to be formed. When the optical recording layer ratio in the pregroove exceeds about 57%, as will be described later with reference to FIG. 5, the DC-Jitter is difficult to be controlled within a standard value.

(2) The projecting depth (Hsg−Hsd) of the light-reflective layer in the pregroove is controlled to be about 93 nm to about 140 nm. When the projecting depth is less than about 93 nm, as will be described later with reference to FIG. 6, the DC-Jitter is difficult to be controlled within the standard value. When the projecting depth exceeds about 140 nm, the recording pit 10 having sufficient dimensions is difficult to be formed because of an insufficient amount of dye in the pregroove 7.

(3) The thickness (Hsd) of the optical recording layer in the pregroove is controlled to be about 35 nm to about 83 nm. When the thickness is less than about 35 nm, the recording pit 10 having sufficient dimensions is difficult to be formed because of an insufficient amount of dye in the pregroove 7. When the thickness exceeds about 83 nm, as will be described later with reference to FIG. 7, the DC-Jitter is difficult to be controlled within the standard value.

(4) The inclination angle (α) of the optical recording layer in the pregroove is controlled to be about 38.5 degrees to 60 degrees. When the angle is less than about 38.5 degrees, as will be described later with reference to FIG. 8, the DC-Jitter is difficult to be controlled within the standard value. When the angle exceeds about 60 degrees, the shape of the light-reflective layer 4 is significantly distorted. As a result, a sufficient reflectance is difficult to be provided.

(5) The leveling value ((Hsg−Hdg)/Hsg) of the optical recording layer is controlled to be about 0.15 to about 0.26. When the leveling value is less than about 0.15, the shape of the light-reflective layer 4 is significantly distorted. As a result, a sufficient reflectance is difficult to be provided. When the leveling value exceeds about 0.26, as will be described later with reference to FIG. 9, the DC-Jitter is difficult to be controlled within the standard value.

(6) The light-reflective layer ratio in the pregroove is controlled to be about 43% to about 70%.

The above Items (1) to (5) in embodiments of the present invention independently affect thermal control during high speed recording. In order to satisfy a high speed recording of 8× speed or more, the shape of the optical information recording medium is advantageous to satisfy at least one of the conditions defined by Items (1) to (5). Among the Items (1) to (5), Item (1) and Item (2) particularly affect thermal control. Therefore, the shape is advantageous to satisfy at least one of the conditions defined by the Items (1) and (2).

The effect of shapes of components such as the substrate 2, the optical recording layer 3, and the light-reflective layer 4 on the characteristics of high speed recording of the media will now be described with reference to the experimental results. FIG. 5 is a graph showing the relationship between an asymmetry value at which DC-Jitter>13% and the optical recording layer ratio in the pregroove 7. The abscissa represents an asymmetry value at which the DC-Jitter exceeds 13%, and the ordinate represents the optical recording layer ratio in the pregroove. Herein, the DC-Jitter represents the data to clock jitter. The DC-Jitter is a jitter value obtained when the optical information recording medium 1 is rotated by 360 degrees, and represents the fluctuation of the recording pit 10. In DVD-R, when the DC-Jitter exceeds 13%, an error signal (PI error) easily exceeds the standard value 280. The asymmetry value represents the deviation of the recording pits 10 in DVD-R from the intended recording position. The deviation is calculated for the average values in the pit length of 3T to 14T. An experimental result shows that, in order to further improve the recording sensitivity of a recording media, the asymmetry value should be shifted to the positive side as much as possible in the design. Therefore, in high speed recording, the asymmetry value is preferably in the range of about −5% to about 15%. For example, at 8× speed, the asymmetry value is preferably shifted from about −5% to the positive side, and at 16× speed, the asymmetry value is preferably shifted from about +5% to the positive side. In FIG. 5, a recording result at 16× speed is expected based on the result of DC-Jitters obtained from recordings at 1× speed, 2× speed, 4× speed, 6× speed, and 8× speed. Referring to FIG. 5, as the optical recording layer ratio in the pregroove decreases (that is, as the light-reflective layer ratio in the pregroove increases), the asymmetry value at which the DC-Jitter exceeds 13% is shifted to the positive side. In other words, when the ratio of projecting part of the light-reflective layer 4 to the pregroove 7 is increased, the amount of heat generated during recording is immediately dissipated and diffused from the light-reflective layer 4 composed of a metal film. As supported by the graph in FIG. 5, when the asymmetry value is about −5%, the optical recording layer ratio in the pregroove is preferably not over about 63%. When the asymmetry value is about +5%, the optical recording layer ratio in the pregroove is preferably not over about 57%.

Figure 6:
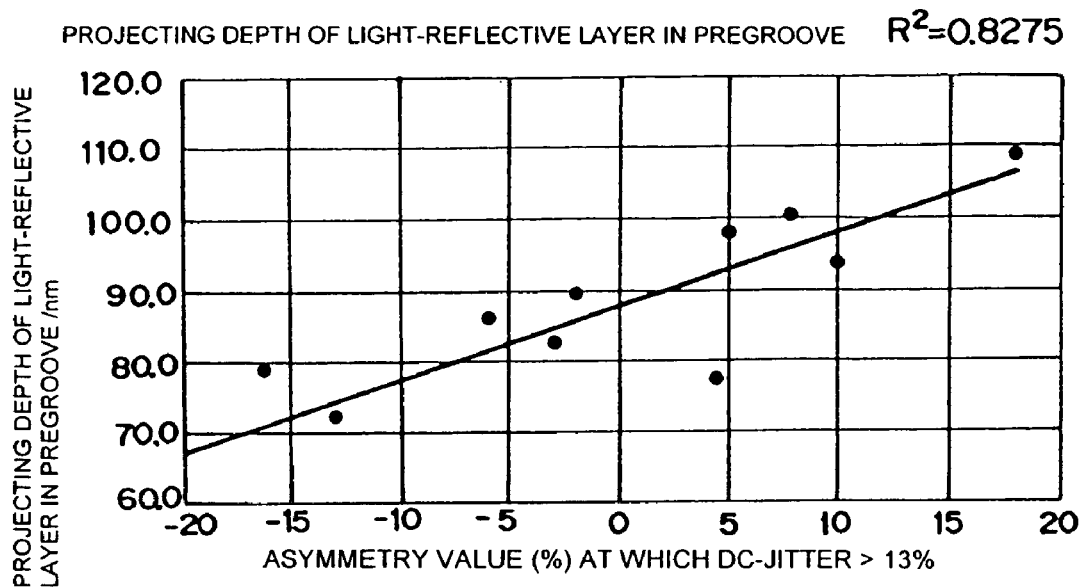
FIG. 6 is a graph showing the relationship between the asymmetry value at which DC-Jitter>13% and the projecting depth of the light-reflective layer in the pregroove, according to an embodiment of the present invention.

FIG. 6 is a graph showing the relationship between the asymmetry value at which DC-Jitter>13% and the projecting depth of the light-reflective layer 4 in the pregroove 7. As the projecting depth of the light-reflective layer 4 in the pregroove 7 increases, the asymmetry value at which the DC-Jitter exceeds 13% is shifted to the positive side. As supported by the graph in FIG. 6, the projecting depth of the light-reflective layer 4 in the pregroove 7 is preferably at least about 83 nm, and more preferably, at least about 93 nm.

Figure 7:
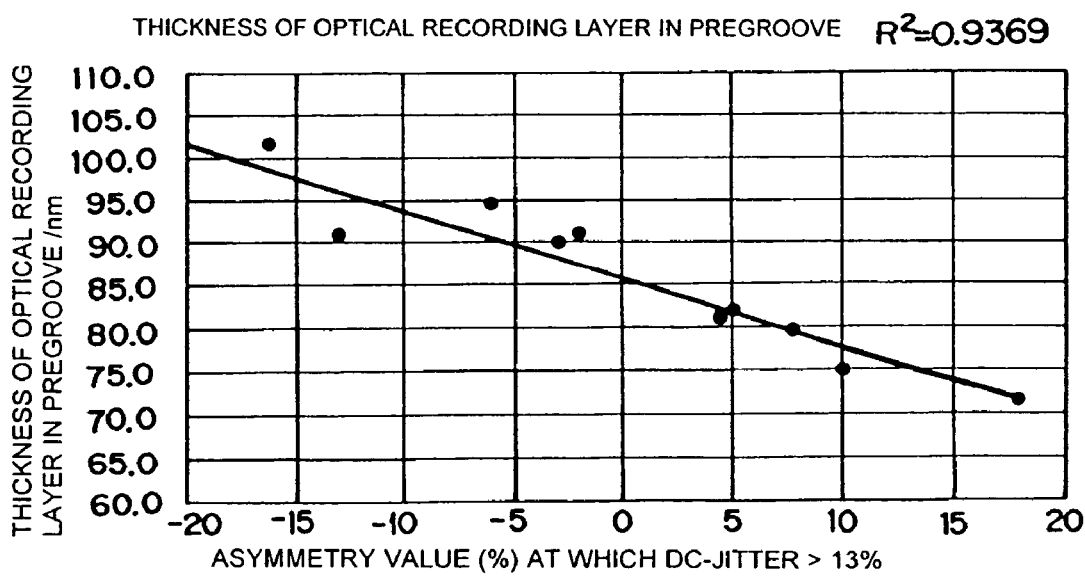
FIG. 7 is a graph showing the relationship between the asymmetry value at which DC-Jitter>13% and the thickness of the optical recording layer in the pregroove, according to an embodiment of the present invention.

FIG. 7 is a graph showing the relationship between the asymmetry value at which DC-Jitter>13% and the thickness of the optical recording layer 3 in the pregroove 7. As the thickness of the optical recording layer 3 in the pregroove 7 decreases, the asymmetry value at which the DC-Jitter exceeds 13% is shifted to the positive side. As supported by the graph in FIG. 7, the thickness of the optical recording layer 3 in the pregroove 7 is preferably not over about 90 nm, and more preferably, not over about 83 nm.

Figure 8:
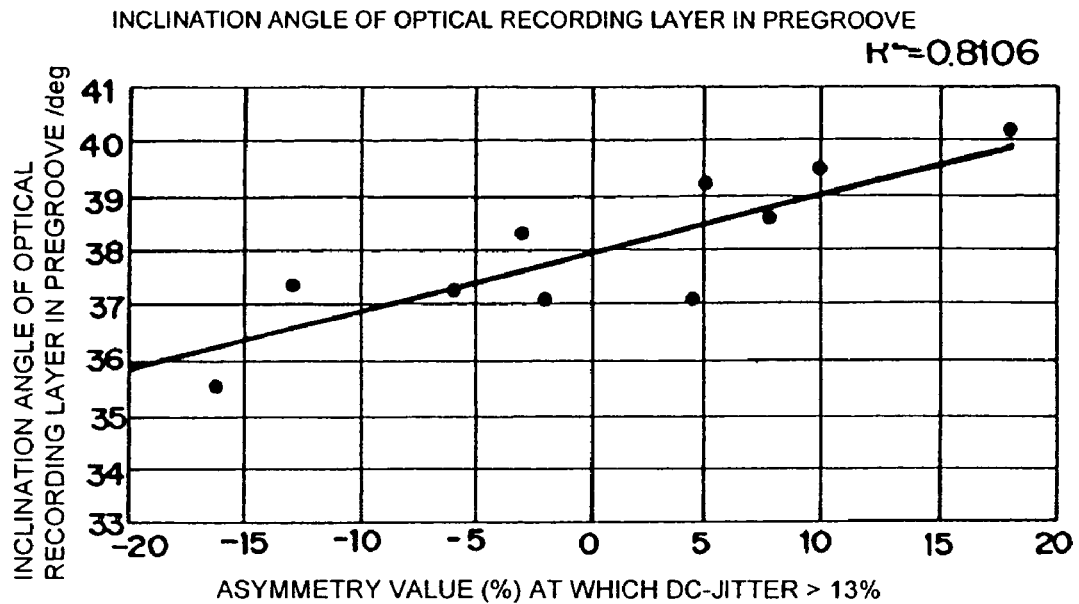
FIG. 8 is a graph showing the relationship between the asymmetry value at which DC-Jitter>13% and the inclination angle of the optical recording layer in the pregroove, according to an embodiment of the present invention.

FIG. 8 is a graph showing the relationship between the asymmetry value at which DC-Jitter>13% and the inclination angle of the optical recording layer 3 in the pregroove 7. As the inclination angle increases, the asymmetry value at which the DC-Jitter exceeds 13% is shifted to the positive side. As supported by the graph in FIG. 8, the inclination angle of the optical recording layer 3 in the pregroove 7 is preferably at least about 37.5 degrees, and more preferably, at least about 38.5 degrees.

Figure 9:
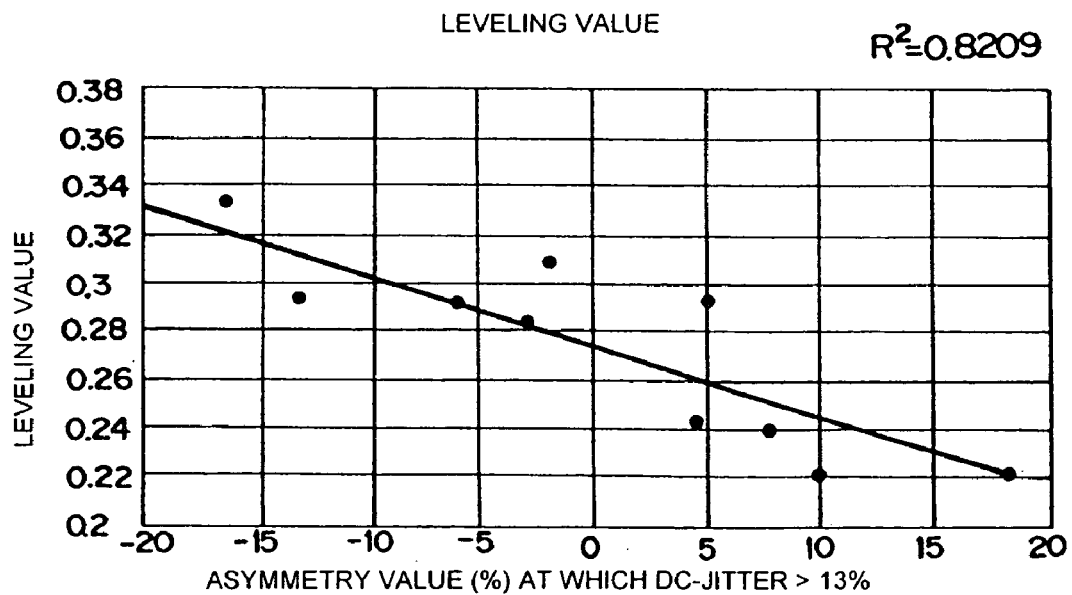
FIG. 9 is a graph showing the relationship between the asymmetry value at which DC-Jitter>13% and the leveling value of the optical recording layer, according to an embodiment of the present invention.

FIG. 9 is a graph showing the relationship between the asymmetry value at which DC-Jitter>13% and the leveling value of the optical recording layer 3. As the leveling value decreases, the asymmetry value at which the DC-Jitter exceeds 13% is shifted to the positive side. As supported by the graph in FIG. 9, the leveling value of the optical recording layer 3 is preferably not over about 0.29, and more preferably, not over about 0.26.

EXAMPLES

Examples of the present invention will now be described.

Example 1

Figure 10:
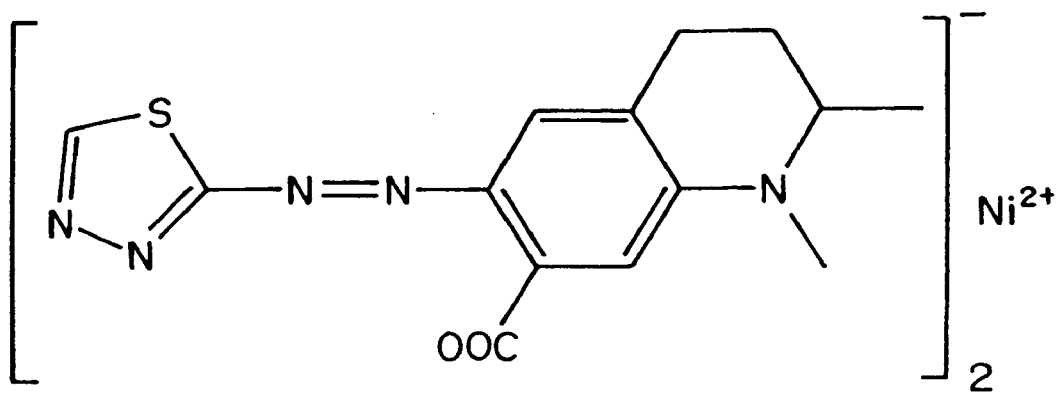
FIG. 10 shows a chemical formula of a first compound (azo dye) used in Example 1, Example 2, Comparative Example 1, and Comparative Example 2 according to an embodiment of the present invention.

A first compound (azo dye) (0.2 g) shown in FIG. 10 was dissolved in 2,2,3,3-tetrafluoro-1-propanol (10 mL) to prepare an coating solution. A disc-shaped substrate 2 composed of polycarbonate and having an outer diameter of 120 mm and a thickness of 0.6 mm was prepared. The substrate 2 included a continuous pregroove 7 having a depth of 180 nm. The above solution was applied on the substrate 2 by spin coating to form an optical recording layer 3 having an average dye film thickness of about 50 nm. A light-reflective layer 4 having a thickness of 100 nm was formed on the optical recording layer 3 by sputtering silver (Ag). Furthermore, an ultraviolet-curing resin SD-318 (from Dainippon Ink and Chemicals, Incorporated) was applied on the light-reflective layer 4 by spin coating. The resultant substrate 2 was irradiated with ultraviolet rays to cure the resin, forming a protective layer 5. An adhesive layer composed of an ultraviolet-curing resin was applied on the surface of the protective layer 5 to bond with a dummy substrate 6 composed of the same material and having the same shape as the substrate 2. The resultant substrate was irradiated with ultraviolet rays to cure the adhesive layer. Thus, a write-once optical information recording medium 1 was prepared. To obtain a desired shape for the optical recording layer 3 and the light-reflective layer 4, the factors of the substrate 2, such as shape, adjustments of the coating solution including viscosity or the concentration, and the conditions for applying the coating solution by spin coating such as the revolution speed.

High speed recording was performed on the above optical information recording medium 1 with the optical recording layer 3 by a disc checker (DDU-1000, from Pulstec Industrial Co., Ltd.) including a semiconductor laser (NA=0.65) having a wavelength of 660 nm. In this test, an EFM signal was recorded with a linear velocity of 28 m/s at 8× speed. After the recording, the signal was played back with a laser output of 0.7 mW using the disc checker. The reflectance, the modulation amplitude, the error rate, and the jitter were measured. The reflectance ($R_{top}$) was 45.3%, the modulation amplitude ($I_{14}/I_{top}$) was 75.3%, the error rate was 1.4, and the jitter was 6.5%. According to the standard values, the reflectance must exceed 45%, the modulation amplitude must exceed 60%, the error rate (PI value) must be less than 280, and the jitter must be less than 8%. Thus, the above optical information recording medium satisfied all these standard values including reflectance, modulation amplitude, error rate (PI value), and jitter.

Another disc, other than the disc used for evaluating the recording property, was prepared. This disc was broken apart at the boundary (second boundary 12) between the light-reflective layer 4 and the optical recording layer 3, and decomposed. The methods of decomposing etc. were the same as described above. The shape of the decomposed disc was measured with an AFM measuring apparatus. The substrate groove angle (β) was 69.1 degrees, and a substrate groove width (full width at half-maximum) was 301 nm. Herein, the substrate groove width (full width at half-maximum) represents a width at the half-way position of the substrate groove depth (Hsg). Numerical values related to, for example, the optical recording layer ratio in the pregroove, i.e., $[\{(Wst+Wsb)\times Hsg/2\}-\{(Wst-2\times Wx+Wdb)\times(Hsg-Hsd)/2\}/\{(Wst+Wsb)\times Hsg/2\}]\times 100$ shown in FIG. 4, were as follows:

Wst=370 nm,
Wsb=232 nm,
Hsg=180.2 nm,
Wx=−9.4 nm,
Wdb=131 nm,
Hsd=71.4 nm,
α=40.2 degrees, and
Hdg=140.3 nm The value Wx was a negative value because the rounded shape of the actual substrate 2 was approximated in the measurement. However, this error did not cause a problem in the evaluation of the actual recording medium.

The following items were calculated based on the above values.

(1) The optical recording layer ratio in the pregroove;
(2) The projecting depth (Hsg−Hsd) of the light-reflective layer in the pregroove;
(3) The thickness (Hsd) of the optical recording layer in the pregroove;
(4) The inclination angle (α) of the optical recording layer in the pregroove; and
(5) The leveling value ((Hsg−Hdg)/Hsg) of the optical recording layer.

The table in FIG. 12 shows the calculated values and the DC-Jitter values.

Example 2

A write-once optical information recording medium 1 was prepared as in Example 1, except that the average dye film thickness was about 56 nm, which was thicker than that of Example 1 by about 12%. The recording medium was evaluated and analyzed as in Example 1. The reflectance, the modulation amplitude, the error rate, and the jitter were measured as in Example 1. The reflectance ($R_{top}$) was 46.4%, the modulation amplitude ($I_{14}/I_{top}$) was 80.6%, the error rate was 2.1, and the jitter was 7.4%. According to the result of the shape measurement, the substrate groove angle ($\beta$) was 69.1 degrees, and the substrate groove width (full width at half-maximum) was 301 nm. Numerical values related to, for example, the optical recording layer ratio in the pregroove shown in FIG. 4 were as follows:
Wst=370 nm,
Wsb=232 nm,
Hsg=180.2 nm,
Wx=−1.9 nm,
Wdb=122 nm,
Hsd=79.9 nm,
$\alpha$=38.6 degrees, and
Hdg=137.2 nm The above Items (1) to (5) were calculated based on these values, as in Example 1. The table in FIG. 12 shows the calculated values and the DC-Jitter values.

Example 3

Figure 11:
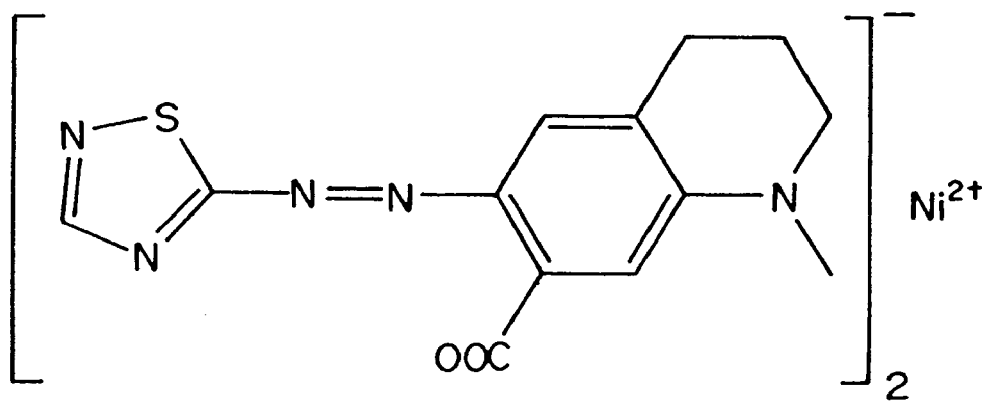
FIG. 11 shows a chemical formula of a second compound (azo dye) used in Example 3 according to an embodiment of the present invention.

A write-once optical information recording medium 1 was prepared as in Example 1, except that the dye was changed from the first compound (shown in FIG. 10) to a second compound (shown in FIG. 11, an azo dye). The recording medium was evaluated and analyzed as in Example 1. The reflectance, the modulation amplitude, the error rate, and the jitter were measured as in Example 1. The reflectance ($R_{top}$) was 53%, the modulation amplitude ($I_{14}/I_{top}$) was 76.1%, the error rate was 2.0, and the jitter was 7.9%. According to the result of the shape measurement, the substrate groove angle ($\beta$) was 69.1 degrees, and the substrate groove width (full width at half-maximum) was 301 nm. Numerical values related to, for example, the optical recording layer ratio in the pregroove shown in FIG. 4 were as follows:
Wst=370 nm,
Wsb=232 nm,
Hsg=180.2 nm,
Wx=−4.1 nm,
Wdb=138 nm,
Hsd=82.2 nm,
$\alpha$=39.2 degrees, and
Hdg=127.5 nm The above Items (1) to (5) were calculated based on these values, as in Example 1. The table in FIG. 12 shows the calculated values and the DC-Jitter values.

Comparative Example 1

A write-once optical information recording medium 1 was prepared as in Example 1, except that the average dye film thickness was about 64 nm, which was thicker than that of Example 1 by about 28%. The recording medium was evaluated and analyzed as in Example 1. The reflectance, the modulation amplitude, the error rate, and the jitter were measured as in Example 1. The reflectance ($R_{top}$) was 45%, the modulation amplitude ($I_{14}/I_{top}$) was 80.9%, the error rate was 314.0, and the jitter was 14.1%. According to the result of the shape measurement, the substrate groove angle ($\beta$) was 69.1 degrees, and the substrate groove width (full width at half-maximum) was 301 nm. Numerical values related to, for example, the optical recording layer ratio in the pregroove shown in FIG. 4 were as follows:
Wst=370 nm,
Wsb=232 nm,
Hsg=180.2 nm,
Wx=8.7 nm,
Wdb=127 nm,
Hsd=94.4 nm,
$\alpha$=37.3 degrees, and
Hdg=127.8 nm The above Items (1) to (5) were calculated based on these values, as in Example 1. The table in FIG. 12 shows the calculated values and the DC-Jitter values.

Comparative Example 2

A write-once optical information recording medium 1 was prepared as in Example 1, except that an optical recording layer 3 having an average dye film thickness of about 65 nm on a substrate 2 including a pregroove 7 having a depth of about 165 nm. The recording medium was evaluated and analyzed as in Example 1. The reflectance, the modulation amplitude, the error rate, and the jitter were measured as in Example 1. The reflectance ($R_{top}$) was 53.1%, the modulation amplitude ($I_{14}/I_{top}$) was 77.1%, the error rate was 418.8, and the jitter was 21.4%. According to the result of the shape measurement, the substrate groove angle ($\beta$) was 69.1 degrees, and the substrate groove width (full width at half-maximum) was 302 nm. Numerical values related to, for example, the optical recording layer ratio in the pregroove shown in FIG. 4 were as follows:
Wst=365 nm,
Wsb=239 nm,
Hsg=163.4 nm,
Wx=25.0 nm,
Wdb=125 nm,
Hsd=90.9 nm,
$\alpha$=37.4 degrees, and
Hdg=115.5 nm The above Items (1) to (5) were calculated based on these values, as in Example 1. The table in FIG. 12 shows the calculated values and the DC-Jitter values.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. An optical information recording medium comprising:
a transparent substrate having a pregroove thereon;
an optical recording layer absorbing a laser beam and formed on the substrate; and
a light-reflective layer reflecting the laser beam and formed on the optical recording layer, wherein optically readable information is recorded by irradiating the laser beam on the optical recording layer through the substrate, and wherein, in the pregroove, the ratio of the cross-sectional area of the light-reflective layer to the cross-sectional area of the pregroove in the direction of the diameter of the optical information recording medium is about 37% to about 70%.

2. The optical information recording medium according to claim 1, wherein the light-reflective layer ratio in the pregroove is about 43% to about 70%.

3. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer through the substrate,
wherein, in the pregroove, the ratio of the cross-sectional area of the optical recording layer to the cross-sectional area of the pregroove in the direction of the diameter of the optical information recording medium is about 30% to about 63%,
and wherein a projecting depth of the light-reflective layer in the pregroove is about 83 nm to about 140 nm.

4. The optical information recording medium according to claim 3, wherein a projecting depth of the light-reflective layer in the pregroove is about 93 nm to about 140 nm.

5. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer though the substrate,
wherein, in the pregroove, the ratio of the cross-sectional area of the optical recording layer to the cross-sectional area of the pregroove in the direction of the diameter of the optical information recording medium is about 30% to about 63%,
and wherein the optical recording layer has a thickness of about 35 nm to about 90 nm in the pregroove.

6. The optical information recording medium according to claim 5, wherein the optical recording layer has a thickness of about 35 nm to about 83 nm in the pregroove.

7. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer through the substrate,
wherein, in the pregroove, the ratio of the cross-sectional area of the optical recording layer to the cross-sectional area of the pre groove in the direction of the diameter of the optical information recording medium is about 30% to about 63%,
and wherein an inclination angle of the optical recording layer in the pregroove is about 37.5 degrees to about 60 degrees.

8. The optical information recording medium according to claim 7, wherein an inclination angle of the optical recording layer in the pregroove is about 38.5 degrees to about 60 degrees.

9. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer through the substrate,
wherein, in the pregroove, the ratio of the cross-sectional area of the optical recording layer to the cross-sectional area of the pregroove in the direction of the diameter of the optical information recording medium is about 50% to about 63%,
and wherein the optical recording layer has a leveling value of about 0.15 to about 0.29.

10. The optical information recording medium according to claim 9, wherein the optical recording layer has a leveling value of about 0.15 to about 0.26.

11. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer through the substrate,
wherein, in the pregroove, the ratio of the cross-sectional area of the optical recording layer to the cross-sectional area of the pregroove in the direction of the diameter of the optical information recording medium is about 30% to about 63%,
and wherein a reference scanning velocity during recording is about 3.49 m/s.

12. An optical information recording medium comprising:
a transparent substrate having a pregroove thereon;
an optical recording layer absorbing a laser beam and formed on the substrate; and
a light-reflective layer reflecting the laser beam and formed on the optical recording layer,
wherein optically readable information is recorded by irradiating the laser beam on the optical recording layer through the substrate,
wherein, in the pregroove, the ratio of the cross-sectional area of the optical recording layer to the cross-sectional area of the pregroove in the direction of the diameter of the optical information recording medium is about 30% to about 63%,
and wherein the optical information recording medium can be compatible with a recording speed of Sn, where S represents a reference scanning velocity during recording, and n represents an integer of 8 or more.

13. An optical information recording medium comprising:
a transparent substrate having a pregroove thereon;
an optical recording layer absorbing a laser beam and formed on the substrate; and a light-reflective layer reflecting the laser beam and formed on the optical recording layer, wherein optically readable information is recorded by irradiating the laser beam on the optical recording layer through the substrate, wherein, in the pregroove, the ratio of the cross-sectional area of the optical recording layer to the cross-sectional area of the pregroove in the direction of the diameter of the optical information recording medium is about 30% to about 57%, and wherein the optical information recording medium can be compatible with a recording speed of Sn, where S represents a reference scanning velocity during recording, and n represents an integer exceeding 8.

* * * * *

UNITED STATES PATENT AND TRADEMARK OFFICE
CERTIFICATE OF CORRECTION

PATENT NO. : 7,542,406 B2
APPLICATION NO. : 11/020912
DATED : June 2, 2009
INVENTOR(S) : Uchida et al.

It is certified that error appears in the above-identified patent and that said Letters Patent is hereby corrected as shown below:

In Column 15, line 40 (approx.) – In Claim 5, change "though" to --through--.

In Column 15, line 62 – In Claim 7, change "pre groove" to --pregroove--.

In Column 16, line 19 (approx.) – In Claim 9, change "50%" to --30%--.

Signed and Sealed this

Sixth Day of April, 2010

David J. Kappos
*Director of the United States Patent and Trademark Office*